Patented July 28, 1953

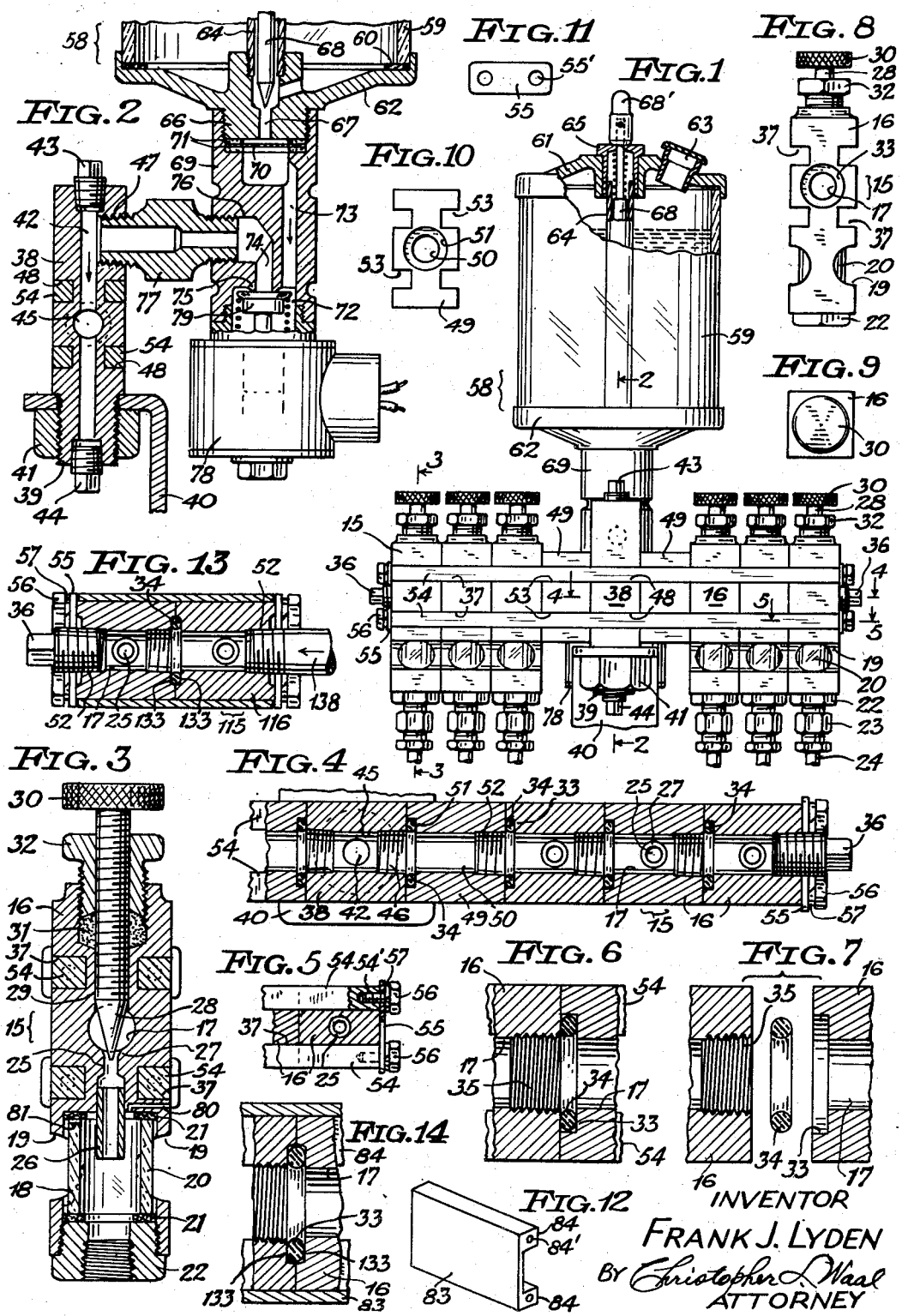

2,646,856

UNITED STATES PATENT OFFICE 2,646,856

MULTIPLE OILER

Frank J. Lyden, Milwaukee, Wis.

Application January 31, 1951, Serial No. 208,789

18 Claims. (Cl. 184—81)

1

The present invention relates to lubricating devices and more particularly to multiple oilers.

An object of the invention is to provide a simple and durable oiler which can be easily assembled and inexpensively manufactured, which will enable the use of a substantial number of sight feed valves in a limited space, which will permit the number of valves to be readily increased or decreased even in the field, which will allow easy replacement of damaged valves, and which will avoid leakage between adjacent gang-mounted valves.

Another object is to provide an oiler which is of rigid construction, which will simplify mounting and facilitate cleaning, and which will reduce flow resistance and afford a supply of clean oil.

A further object is to provide an improved feed valve which can readily be assembled with one or more similar valves to form a multiple oiler.

The invention further consists in the several features hereinafter described and claimed.

In the accompanying drawing,

Fig. 1 is a front elevational view of a multiple oiler constructed in accordance with the invention;

Fig. 2 is a sectional elevational view taken generally on the line 2—2 of Fig. 1;

Fig. 3 is a sectional elevational view taken generally on the line 3—3 of Fig. 1;

Fig. 4 is a sectional view taken generally on the line 4—4 of Fig. 1;

Fig. 5 is a sectional view of an end portion of the oiler, taken generally on the line 5—5 of Fig. 1;

Fig. 6 is a fragmentary detail sectional view taken on the same plane as Fig. 5, showing a sealed joint between adjacent sight feed valves;

Fig. 7 is a fragmentary detail sectional view in the same plane as Fig. 6, showing the valves separated;

Fig. 8 is a detail elevational view of one of the sight feed valves;

Fig. 9 is a top view of one of the sight feed valves;

Fig. 10 is a detail elevational view of a spacing member for the valve assembly;

Fig. 11 is a detail view of a clamping plate for the valve assembly;

Fig. 12 is a perspective view of a modified form of retaining bar for the oiler assembly;

Fig. 13 is a sectional view similar to Fig. 4, but showing a modified form of oiler assembly with an end oil inlet and with the retaining members of Fig. 12, and Fig. 14 is a fragmentary detail sectional view

2 of the assembly of Fig. 13 and showing a sealed joint between adjacent feed valves.

In the drawing, 15 designates each of a plurality of sight feed valves which are assembled with other parts as hereinafter described to form a multiple or gang oiler. Each valve includes an elongated vertical block-like valve body 16 which is of square cross-section and is formed of a suitable metal, such as an aluminum alloy. The valve body has a transverse horizontal oil inlet bore 17 therethrough adapted to register with similar bores formed in adjacent bodies to provide a manifold passage. The lower end portion of each valve body has a large vertical bore 18 which is intersected at opposite sides by horizontal channels 19 of semi-circular cross-section. Axially extending in the bore 18 is a vertical sight tube 20 of glass or transparent plastic seated at its upper and lower ends against gaskets 21 and confined by a bushing 22 screw-threaded into the lower end of the bore. The bushings of the several valves are provided with couplings 23 connected to delivery tubes 24 leading to various machine parts to be lubricated. A vertical bore or orifice 25 is formed centrally in each valve body between the transverse bore 17 and the upper end of the bottom bore 18. A drip nozzle 26 is secured at its upper end in the bore 25 and has its lower end extending into the sight chamber formed in the sight tube 20. The upper end of the bore 25 has a tapered valve seat 27. A vertical needle valve 28 is screw-threaded in a central vertical bore 29 extending in the valve body above the transverse bore 17, the needle valve having a tapered lower end adapted to cooperate with the valve seat 27, and having a knurled thumb wheel 30 at its upper end. A packing 31 in the valve body surrounds the intermediate portion of the needle valve and is retained by a packing nut 32 which is screw-threaded into the upper end of the valve body and which receives therethrough the needle valve. The needle valve serves to control the rate of flow of oil from the horizontal passage 17 into the drip bore 25 and is frictionally retained in adjusted position by the packing 31. The needle valve can be raised to permit free communication between the bores 17 and 25, and can be raised further to a point above the transverse bore 17.

The transverse through bore 17 in each valve body has a concentric counterbore 33 at one end adapted to receive an O-ring 34 of oil-resisting resilient rubber-like material for sealing abutting faces of laterally adjacent valve bodies. The depth of the counterbore is slightly smaller than the thickness of the O-ring, so that the O-ring is placed under axial compression when the oiler is assembled. The other end of the transverse bore 17 has a screw-thread 35 adapted to receive a pipe plug 36 when the valve body is endmost in the assembly. The opposite flat side faces of each valve body are provided with horizontal upper and lower channels 37 of square cross-section arranged above and below the plane of the transverse bore 17, and adapted to receive retaining means hereinafter described.

A vertically extending block-like mounting body 38 of square cross-section has a reduced, screw-threaded, shoulder-forming lower end portion 39 adapted to pass through a suitable supporting bracket 40 which is clamped to the body by a nut 41 on the end portion 39. The mounting body, which is formed of a suitable metal such as an aluminum alloy, has a central vertical bore 42 closed at its upper and lower ends by pipe plugs 43 and 44, the lower portion of the bore forming a sediment chamber, and the lower plug 44 forming a drain plug. A transverse bore 45 intersects the vertical bore 42 and is aligned with the transverse bores 17 of the several valve bodies. In some instances, the opposite ends of the bore 45 may be provided with screw threads 46. A lateral, screw-threaded oil inlet bore 47 communicates with the upper portion of the vertical bore 42, and is supplied with oil as hereinafter described. At opposite sides of the mounting body are a pair of horizontal channels 48 of square cross-section aligned with the corresponding channels 37 of the valve bodies. A pair of vertically extending block-like spacer bodies 49 of square cross-section, and formed of a suitable metal, such as an aluminum alloy, are disposed at opposite sides of the mounting body and between the mounting body and the nearest valve bodies. Each spacer body has a transverse bore 50 aligned with the valve body bores 17 and the mounting body bore 45. At one end of the transverse bore 50 of each spacer body is a counterbore 51 adapted to receive an O-ring 34 to provide a sealing engagement between the spacer body and the mounting body. At the other end of the transverse bore 50 is a screw thread 52 which is adapted to be closed by a screw plug (not shown) in the absence of an adjacent valve body. At opposite sides of each spacer body are a pair of parallel channels 53 aligned with the similar channels of the mounting body and the valve bodies. The valve bodies, spacer bodies and mounting body are all of the same cross-sectional area and are conveniently formed from square bar stock. By way of example, in a typical oiler these bodies may be formed of bar stock ⅞" square.

The typical multiple oiler shown in the drawing includes a series of three sight feed valves at each of the opposite sides of the mounting body, but it will be understood that any reasonable number of valves may be provided. It is preferred to have at least one valve at each side of the mounting body, but in some instances the valves may be disposed entirely at one side of the mounting body, and the opposite spacer block may be omitted. The several block-like bodies are held in laterally abutting assembled relation by retaining means including four rods or bars 54 of square cross-section fitting in the aligned lateral grooves or channels 37, 48, and 53 formed in these bodies, the outer side faces of the rods being flush with flat side faces of the bodies. The opposite ends of the rods are connected by transverse clamping plates 55 laterally engaging the endmost bodies and secured to the rods by screws 56 passing through holes 55' in the plates and threaded into openings 54' extending axially in the ends of the rods, the screws being provided with lock washers 57 and the rods being slightly shorter than the length of body assembly or stack. In assembling the several bodies, the tightening of the screws 56 will axially compress the several O-rings and bring the adjacent flat faces of the bodies into firm contact, the O-rings sealing the joints between the bodies against leakage.

Oil is supplied to the inlet opening 47 of the mounting body from a suitable oil reservoir 58 here shown to include a transparent tubular casing member 59 of glass or plastic fitting against gaskets 60 in upper and lower heads 61 and 62, the upper head having a filling nozzle 63. The heads are connected by a central vertical tube 64 which is screwed at its lower end into the lower head and is screwed at its upper end into a headed bushing 65 rotatably fitting in the upper head. The lower head 62 has a downwardly projecting screw-threaded boss 66 with a central outlet bore 67. In some instances, the reservoir may be provided with a manually operable needle valve 68 of conventional spring-closed type which extends axially in the tube 64 to cooperate with the bore 67, the valve having at its upper end the usual toggle lever 68' bearing on the upper face of the bushing 65. The boss 66 is threaded into the recessed upper end of a control valve body 69. A filter screen or sieve 70 is confined in the recessed upper end of the valve body 69 and is disposed between packing rings 71. The valve body 69 has a recess 72 in its lower end which communicates with the upper recessed end of the body by a longitudinally extending bore 73 arranged eccentrically in the body. A discharge port 74 extends centrally upwardly from the bottom recess 72 and has a valve seat 75 at its lower end. The upper end of the discharge port communicates with a recess 76 opening laterally of the valve body. A horizontal tubular coupling member 77 is screwed at opposite ends into the recess 76 and the lateral opening 47 of the mounting member 38 to provide communication between the control valve body and the mounting member and to support the oil reservoir from the mounting member. A solenoid 78 is screwed into the bottom recess 72 of the control valve body and has an upwardly spring-urged valve member 79 which is engageable with the valve seat 75 to close the discharge port 74. When the solenoid is energized the valve member 79 is retracted downward to expose the discharge port, thus permitting oil to flow by gravity from the reservoir to the mounting body 38 and thence through the transverse bores of the spacer bodies 49 and the several sight feed valve bodies 16. The solenoid winding of the control valve is connected in a suitable control circuit, not shown, so as to be energized whenever a machine served by the oiler is in operation. The valve seat 75 of the control valve is at an elevation not far from the elevation of the oil passages 17 in the sight feed valves.

In some installations, air trapped in the delivery tube 24 extending from a sight feed valve may prevent proper feeding of oil through the tube. In such case, a small passage 80, Fig. 3, is formed in the valve body 16 and extends upwardly from the chamber in the sight tube 20 to form an air vent. As an alternative a venting notch 81 may be formed in the upper edge of the sight tube.

In the operation of the multiple oiler, the solenoid valve 78 is opened when the machine (not shown) is started in operation, permitting oil to flow by gravity from the reservoir 58 through the outlet bore 67, screen 70, passage 73 and discharge port 74 of the control valve body, coupling member 77, vertical bore 42 and horizontal bore 45 of the mounting body, the transverse bore 50 of each spacer body, and the aligned transverse bores 17 of the several valve bodies. The downward feed of the oil from each valve body is adjusted by the needle valve 28 and is observed through the sight tube 20. When the machine stops the solenoid valve 18 closes, thus shutting off the flow of oil.

The several sight feed valves 15 are interchangeable, and a considerable number of these valves can be included in the oiler assembly, it being only necessary to provide retaining rods or bars 54 of suitable length. It is also possible to add or remove valves in the field to suit requirements, and any damaged valve can be readily replaced. The lower end portion of the vertical bore 42 in the mounting body forms a sediment chamber which can be drained by removing the screw plug 44. The horizontal manifold passage through the block-like bodies of the oiler assembly can be cleaned by inserting a cleaning implement therein after removing the end plugs 36 and raising the needle valves 28.

In some instances the square retainer bars 54 for the oiler assembly may be replaced by a channel member 83, one being shown in Fig. 12. The channel members have bar-forming flanges 84 which fit in the horizontal grooves or channels of the several bodies of the oiler assembly, and the ends of the flanges have screw-threaded openings 84' to receive screws 56, as in Fig. 5.

The modified form of valve assembly shown in Figs. 13 and 14 includes a pair of sight feed valves 115 which are generally similar to the valves 15. Each of the valves 115 has a valve body 116 provided with a transverse through bore 17 and with shallow frusto-conical counterbores 133 at opposite ends of the bore 117. The confronting counterbores of the abutting valve bodies receive and compress therein a sealing O-ring 34. The two (or more) valve bodies are clamped together in the same manner as the assembly of Fig. 1, except that the channel members 83 of Fig. 12 are provided, and the spacer bodies and mounting body of Fig. 1 are omitted. However, the square bars 54 could equally well be provided in the assembly of Fig. 13. The valve assembly is supported on an oil inlet pipe 138 which is threaded into the end of the transverse bore of one of the valve bodies. The bore at the opposite end of the assembly is closed by a plug 36. The transverse bore 17 of each valve body has a screw thread 52 at one end or at each end.

The oil may be supplied to each form of oiler either by gravity or pump pressure. In the form of oiler shown in Fig. 1, the incoming oil may be introduced at any one of various points, such as the upper and lower ends of the mounting body bore 42 or the opposite ends of the manifold passage formed by the bores 17. It is also possible to supply oil to each oiler assembly by connecting it to a circulating oiling system.

What I claim as new and desire to secure by Letters Patent is:

1. In an oiler, a plurality of laterally adjacent bodies each having a transverse opening, the openings in adjacent bodies communicating to form an oil passage, oil supply means connected to said passage, at least one of said bodies being a valve body and having a valved discharge communicating with the transverse opening therein, compressible sealing means between adjacent bodies, and retaining means holding the laterally adjacent bodies in assembled relation and compressing said sealing means, said retaining means comprising tension members extending along said plurality of bodies in parallel relation to said transverse openings.

2. In an oiler, a plurality of laterally adjacent bodies each having a transverse opening, the openings in adjacent bodies communicating to form an oil passage, oil supply means connected to said passage, at least one of said bodies being a valve body and having a valved discharge communicating with the transverse passage therein, compressible sealing means between adjacent bodies, said adjacent bodies being transversely channeled at opposite sides, and retaining means holding the laterally adjacent bodies in assembled relation and including parts extending in said channels.

3. In an oiler, a plurality of laterally adjacent bodies each having a transverse opening, the openings in adjacent bodies communicating to form an oil passage, oil supply means connected to said passage, at least one of said bodies being a valve body and having a valved discharge communicating with the transverse opening therein, compressible sealing means between adjacent bodies, and retaining means holding the laterally adjacent bodies in assembled relation, said retaining means comprising tension bars extending along said plurality of bodies in parallel relation to said transverse openings.

4. In an oiler, a plurality of laterally adjacent bodies each having a transverse opening, the openings in adjacent bodies communicating to form an oil passage, oil supply means connected to said passage, at least one of said bodies being a valve body and having a valved discharge communicating with the transverse opening therein, a resilient packing ring disposed between adjacent bodies and extending about the axis of said passage, and retaining means detachably holding the laterally adjacent bodies in assembled relation and compressing said packing ring, said retaining means comprising tension members extending along said plurality of bodies in parallel relation to said transverse openings.

5. In an oiler, a plurality of laterally adjacent bodies each having a transverse opening, the openings in adjacent bodies communicating to form an oil passage, oil supply means connected to said passage, at least one of said bodies being a valve body and having a valved discharge communicating with the transverse opening therein, said laterally adjacent bodies having confronting lateral faces one of which has a recess surrounding said passage, a resilient packing ring disposed in said recess, and retaining means detachably holding the laterally adjacent bodies in assembled relation and compressing said packing ring between said confronting faces, said retaining means comprising tension members extending along said plurality of bodies in parallel relation to said transverse openings.

6. In an oiler, a plurality of laterally adjacent bodies each having a transverse opening, the openings in adjacent bodies communicating to form an oil passage, oil supply means connected to said passage, at least one of said bodies being a valve body and having a valved discharge communicating with the transverse opening therein, compressible sealing means between adjacent bodies, said bodies having aligned transverse channels at opposite sides, retaining bars extending in said channels, and clamping means connected to the ends of said bars for holding said plurality of bodies in assembled relation.

7. In an oiler, a series of laterally abutting bodies having respective transverse openings communicating to form an oil passage, one of said bodies forming a mounting body, oil supply means connected to said mounting body and communicating with said passage, two others of said bodies forming spacer bodies abutting against opposite sides of said mounting body, and still others of said bodies forming valve bodies and having respective valved discharges communicating with the transverse openings in said valve bodies, and retaining means holding said series of bodies in assembled relation.

8. In an oiler, a plurality of laterally abutting bodies having respective transverse openings communicating to form an oil passage, one of said bodies forming a mounting body, oil supply means connected to said mounting body and communicating with said passage, another of said bodies forming a valve body and having a valved discharge communicating with the transverse opening in said valve body, and retaining means for holding said bodies in assembled relation.

9. In an oiler, a plurality of laterally adjacent bodies each having a transverse opening, the openings in adjacent bodies communicating to form an oil passage, oil supply means connected to said passage, at least one of said bodies being a valve body and having a valved discharge communicating with the transverse opening therein, there being a recess between adjacent bodies, a resilient O-ring of rubber-like material disposed in said recess and surrounding said passage, and retaining means detachably holding the laterally adjacent bodies in assembled relation and compressing said O-ring, said retaining means comprising tension members extending along said plurality of bodies in parallel relation to said transverse openings.

10. In an oiler, a valve body of generally rectangular cross-section having opposite parallel faces adapted to abut against the similar faces of other bodies, said body having a transverse oil-receiving opening therethrough extending to said opposite faces and adapted to communicate with similar openings in other bodies to form an oil passage, said valve body opening including at one end a recess adapted to receive a compressible packing ring for sealing the joint between said valve body and an abutting body, said valve body having retainer-receiving apertures adjacent to opposite sides, and valved oil discharge means in said valve body communicating with said transverse opening.

11. In an oiler, a valve body of generally rectangular cross-section having opposite parallel faces adapted to abut against the similar faces of other bodies, said body having a transverse oil-receiving opening therethrough extending to said opposite faces and adapted to communicate with similar openings in other bodies to form an oil passage, said valve body opening including at one end a recess adapted to receive a compressible packing ring for sealing the joint between said valve body and an abutting body, and valved oil discharge means in said valve body communicating with said transverse opening, the end of the transverse opening distant from the recess having a screw thread adapted to receive a closure plug when said valve body is in a terminal position.

12. In an oiler, a valve body of generally rectangular cross-section having opposite parallel lateral faces adapted to abut against the similar faces of other bodies and further having a pair of opposite parallel lateral faces at right angles to said first-named faces and provided with transverse retainer-receiving channels, said body having a transverse oil-receiving opening therethrough extending to said first-named opposite faces and adapted to communicate with similar openings in other bodies, and valved oil discharge means in said valve body communicating with said horizontal opening.

13. In an oiler, a mounting body having a transverse opening extending to opposite sides thereof and having a vertical longitudinal opening intersecting said transverse opening, the lower end of said mounting body having a screw-threaded portion adapted to be secured to a support, a removable closure for the lower end of said vertical opening, a valve body secured to said mounting body and having a transverse opening in communication with the transverse opening of said mounting body, said valve body having a valved discharge communicating with the transverse opening of said valve body, and an oil supply connecting with the vertical opening of said mounting body.

14. In an oiler, a mounting body having an oil passage, a feed valve body secured to said mounting body and communicating with said oil passage and having a valved discharge, a control valve body disposed laterally of said mounting body and connected thereto, said control valve body having an upper inlet and a lower outlet, an oil supply connected to said inlet, said outlet communicating with said mounting body passage, and an electrically operated valve at the lower portion of said control valve body for controlling the flow of oil to said mounting body.

15. In an oiler, a plurality of laterally adjacent bodies each having a transverse opening, the openings in adjacent bodies communicating to form an oil passage adapted for connection to an oil supply, at least one of said bodies being a valve body and having a valved discharge communicating with the transverse opening therein, said bodies having confronting packing-receiving recesses surrounding the ends of said transverse openings, a packing ring in said recesses, and retaining means for holding laterally adjacent bodies in assembled relation and compressing said packing ring, said retaining means comprising tension members extending along said plurality of bodies in parallel relation to said transverse openings.

16. In an oiler, a plurality of laterally adjacent bodies at least one of which is a valve body having a valved discharge, said bodies having communicating transverse openings forming an oil passage in communication with said discharge, compressible sealing means between adjacent bodies and surrounding said passage, and retaining means holding the laterally adjacent bodies in assembled relation, said retaining means including a channel member extending across and interengaging with said bodies.

17. In an oiler, a valve body having opposite packing-compressing faces adapted to confront the similar faces of other bodies, said body having a transverse oil-receiving opening extending therethrough and adapted to communicate with a similar opening in a laterally adjacent body to form an oil passage, said body further having a longitudinal opening intersecting said transverse opening and having a discharge at its lower portion, a manually adjustable valve member having a stem portion screw-threaded in the upper portion of said longitudinal opening above said transverse opening, said stem passing downwardly across said transverse opening and having a seating portion cooperating with said longitudinal opening below said transverse opening to control the flow of oil from said discharge.

18. In a oiler, a plurality of laterally adjacent bodies having respective transverse openings disposed in communication and adapted for connection to an oil supply, at least one of said valve bodies being a valve body and having a valved discharge communicating with the transverse opening therein, said bodies having aligned exterior channels extending parallel to said openings, and retaining means holding the laterally adjacent bodies in sealed assembled relation, said retaining means including tension bars individually fitting in said channels.

FRANK J. LYDEN.

References Cited in the file of this patent

UNITED STATES PATENTS

| Number | Name | Date |
|---|---|---|
| 1,900,754 | Blanchard | Mar. 7, 1933 |
| 2,047,352 | Blanchard | July 14, 1936 |
| 2,447,509 | Kocher | Aug. 24, 1948 |